United States Patent
Zhong et al.

(10) Patent No.: US 12,441,882 B2
(45) Date of Patent: Oct. 14, 2025

(54) BACTERIAL CELLULOSE-POLYURETHANE COMPOSITE MATERIAL, PREPARATION METHOD THEREFOR, AND APPLICATION THEREOF

(71) Applicants: Chunyan Zhong, Haikou (CN); Yuguang Zhong, Haikou (CN); Hainan Guangyu Biotechnology Co., Ltd, Haikou (CN); Hainan Yeguo Foods Co., Ltd, Haikou (CN)

(72) Inventors: Yuguang Zhong, Haikou (CN); Chunyan Zhong, Haikou (CN)

(73) Assignees: Chunyan Zhong, Haikou (CN); Yuguang Zhong, Haikou (CN); Hainan Guangyu Biotechnology Co., Ltd, Haikou (CN); Hainan Yeguo Foods Co., Ltd, Haikou (CN)

( * ) Notice: Subject to any disclaimer, the term of this patent is extended or adjusted under 35 U.S.C. 154(b) by 675 days.

(21) Appl. No.: 17/847,455

(22) Filed: Jun. 23, 2022

(65) Prior Publication Data
US 2022/0315760 A1  Oct. 6, 2022

Related U.S. Application Data

(63) Continuation of application No. PCT/CN2019/129157, filed on Dec. 27, 2019.

(51) Int. Cl.
*C08L 75/08* (2006.01)
*A61L 15/22* (2006.01)
*C08L 1/02* (2006.01)

(52) U.S. Cl.
CPC ............ *C08L 75/08* (2013.01); *A61L 15/225* (2013.01); *C08L 1/02* (2013.01)

(58) Field of Classification Search
None
See application file for complete search history.

(56) References Cited

U.S. PATENT DOCUMENTS

2019/0160197 A1   5/2019   Gardiner et al.

FOREIGN PATENT DOCUMENTS

| CN | 103370190 A | 10/2013 |
|---|---|---|
| CN | 104592743 A | 5/2015 |
| CN | 109069688 A | 12/2018 |
| CN | 110269749 A | 9/2019 |
| WO | 2016047981 A1 | 3/2016 |

OTHER PUBLICATIONS

Pinto, E.R.P., et al., "Preparation and characterization of the bacterial cellulose/polyurethane nanocomposites", J. Therm. Anal. Calorim (2013) 114: 549-555.

International Search Report for International Application No. PCT/CN2019/129157, "Bacterial Cellulose-Polyurethane Composite Material, Preparation Method Therefor, and Application Thereof", date of mailing: Sep. 21, 2020.

Test methods for primary wound dressings—Part 2: Moisture vapour transmission rate of permeable film dressings, Pharmaceutical Industry Standard of People's Republic of China, issued on Mar. 23, 2004.

Biological evaluation of medical devices—Part 10: Tests for irritation and delayed-type hypersensitivity, National Standard of People's Republic of China, issued on Mar. 23, 2005.

Biological evaluation of medical devices—Part 5: Tests for in of in vitro cytotoxicity, National Standard of People's Republic of China, issued on Dec. 29, 2017.

*Primary Examiner* — Nannette Holloman
(74) *Attorney, Agent, or Firm* — Hamilton, Brook, Smith & Reynolds, P.C.

(57) ABSTRACT

A bacterial cellulose-polyurethane composite material, preparation method, and use are described. The preparation method comprises: performing organic solvent exchange on bacterial cellulose microfibers, and obtaining bacterial cellulose microfiber composite substance A and composite substance B of different concentrations; under oil bath conditions, adding a polymer polyol and a diisocyanate compound and performing an addition polymerization reaction, obtaining, via the reaction, a bacterial cellulose composite polyurethane foam prepolymer; and subsequently performing curing and obtaining the bacterial cellulose-polyurethane composite material. By combining bacterial cellulose microfibers and polyurethane foam material, the mechanical properties of the composite material are significantly improved; the large amount of hydroxyl groups on the surfaces of the bacterial cellulose nanofibers effectively strengthens the hydrophilicity and water absorption capability of the composite material; and the favorable tissue affinity of bacterial cellulose can also improve the biocompatibility of polyurethane material.

16 Claims, No Drawings

BACTERIAL CELLULOSE-POLYURETHANE COMPOSITE MATERIAL, PREPARATION METHOD THEREFOR, AND APPLICATION THEREOF

CROSS-REFERENCE TO RELATED APPLICATIONS

This application is a continuation application of International Application No. PCT/CN2019/129157, filed Dec. 27, 2019, which is hereby incorporated by reference in its entirety.

FIELD OF TECHNOLOGY

The invention belongs to the technical field of skin repair, and to a bacterial cellulose-polyurethane composite material with a gradient structure and the production method and use thereof.

BACKGROUND OF ART

The wound healing process is a continuous dynamic process, which is a process of interaction between cells and cells, between cells and cell matrices, and between cells and soluble media. Clinical wound healing is mainly based on the use of wound dressings. With the popularization of the theory and practice of "wet therapy", high-performance wet dressings with hygroscopic function have attracted more and more attention in the medical and health fields of the world.

At present, dressings commonly used in clinic can be divided into bacterial cellulose dressings, polyurethane dressings, and the like, according to difference in materials.

Bacterial celluloses are polymeric compounds composed of glucose linked by $\beta$-1,4-glycosidic chains. As an excellent biological material, they have unique physical and chemical properties. Bacterial celluloses have a natural three-dimensional nano-network structure; high tensile strength and elastic modulus; high hydrophilicity, good air permeability, water absorption and water permeability, extraordinary water holding capacity and high wet strength. In addition, a large number of studies have shown that bacterial celluloses have good biocompatibility in vivo and in vitro and biodegradability, which makes bacterial celluloses themselves suitable for biomedical applications. The use of bacterial cellulose hydrogels alone as dressings has been reported abroad, and it has been industrialized for clinical use. Therefore, the use of bacterial cellulose hydrogel as the matrix material of the dressing to utilize the water absorbability of bacterial celluloses can continuously and effectively absorb wound exudate and metabolites while ensuring biosafety. Bacterial cellulose hydrogels are promising for use in wound dressings, which provide a moist environment for wounds to promote better wound healing. However, the three-dimensional nano-network structure of the bacterial cellulose hydrogel itself lacks good waterproof and antibacterial properties, and external microorganisms and water can penetrate into the wound through the nano-network. Meanwhile, bacterial cellulose hydrogel dressings have a high moisture vapor transmission rate, and the moisture inside tends to lose during use. These problems restrict the application of bacterial cellulose hydrogel dressings.

Polyurethane is a general term for polymers containing urethane groups (—NHCOO—) in the main chain of the polymer structure. The soft and hard segments in its molecular structure belong to thermodynamically incompatible systems, and are different in polarity, which can cause microphase separation, so it has good biocompatibility and anticoagulant properties. A large number of animal experiments and acute and chronic toxicity experiments have confirmed that the medical polyurethane material has a good compatibility with human blood and tissue, and is non-toxic and non-teratogenic. It has no local allergic response and has good toughness, solvent resistance, hydrolysis resistance and antibacterial properties. Moreover, it is wear-resistant, easy to process and mold, and controllable in properties. Thus, it is considered to be one of the most valuable biomedical synthetic materials. 1) The dressing products made of polyurethane film can keep the wound moist, control the moisture vapor transmission rate, and resist the invasion of microorganisms and external moisture. 2) The polyurethane foam material has good biocompatibility, hydrophilicity and softness, and can absorb body fluid or blood and avoid the formation of effusion. It has good softness and conformability, which is beneficial to adhere to tissues and reduces discomfort and pain. The unique porous structure can also load and release drugs according to needs, does not stick to the tissue, and is easy to be removed and replaced. Polyurethane foam dressings can be used to both keep the wound moist and allow the passage of gas to promote wound healing. However, the biocompatibility, mechanical properties and hydrophilicity of polyurethane foam need to be strengthened in practical applications, especially in the application of human body repair materials, smart drug sustained-release materials and tissue engineering materials.

Therefore, the current skin wound dressing products need to be further improved.

SUMMARY OF THE INVENTION

An object of the present invention is to provide a bacterial cellulose-polyurethane composite material with a gradient structure. Another object of the present invention is to provide a method for producing the bacterial cellulose-polyurethane composite material with a gradient structure. A further object of the present invention is to provide use of the bacterial cellulose-polyurethane composite material with a gradient structure in human body repair materials, smart drug sustained-release materials and tissue engineering materials.

The objects of the present invention are achieved through the following technical solutions:

In an aspect, the present invention provides a method for producing a bacterial cellulose-polyurethane composite material, comprising:

subjecting bacterial cellulose microfibrils to an organic solvent exchange treatment to obtain a complex A and a complex B having different concentrations of bacterial cellulose microfibrils;

wherein the complex A includes 30-50 wt % of fully dehydrated bacterial cellulose microfibrils and a balance of organic solvent based on 100 wt % of the complex A; the complex B includes 15-30 wt % of partially dehydrated bacterial cellulose microfibrils and a balance of organic solvent based on 100 wt % of the complex B; and wherein the partially dehydrated bacterial cellulose microfibrils contain 5-10 wt % of water;

mixing the complex A and the complex B in a volume ratio of 1:(2-5), and adding a polymeric polyol and a diisocyanate compound under the condition of an oil bath for polyaddition reaction, to obtain a bacterial cellulose-polyurethane foam composite prepolymer; and curing the prepolymer to obtain the bacterial cellulose-polyurethane composite material;

wherein the weight ratio of the polymeric polyol to the diisocyanate compound is 1: (0.1-0.2); and the polymeric polyol accounts for 20%-60% of the total weight of the complex A and the complex B.

The invention creatively combines bacterial cellulose and polyurethane to prepare a composite material. Polyurethane foam material is reinforced with bacterial cellulose nanofiber microfibrils evenly distributed inside the polyurethane material. By interaction between residual isocyanate groups in the polyurethane reaction and hydroxyl groups on the surface of the bacterial cellulose nanofiber, the bacterial cellulose nanofiber and the polyurethane foam matrix are effectively bonded with a chemical bonding, so that the mechanical properties of the composite are significantly improved. A large number of hydroxyl groups on the surface of bacterial cellulose nanofibers effectively improve the hydrophilicity and water absorbability of the composite material. Meanwhile, good tissue affinity of the bacterial cellulose can improve the biocompatibility of the polyurethane material and give play to the advantages of the two materials. Thus, an ideal skin wound dressing product can be obtained, which has a great application prospect in the field of biomedicine.

In the present invention, the complex A is a mixture of completely dehydrated bacterial cellulose microfibrils and an organic solvent, and the complex B is a mixture of bacterial cellulose microfibrils having surface free water removed and still containing a small amount of bound water and an organic solvent. In the present invention, a solvent exchange method is adopted to remove part of water molecules without destroying the hydroxyl groups on the surface of the bacterial cellulose nanofibers. A small amount of bound water can react with isocyanate groups to generate carbon dioxide ($2RNCO+H_2O \rightarrow RNHCONHR+CO_2\uparrow$), which functions as a porogenic agent. During the production, due to the different specific gravity of cellulose microfibrils with different water contents, the complex A and the complex B will be automatically layer-separated during sedimentation after they are mixed in a volume ratio of 1:(2-5). The difference in water content will produce different amounts of porogenic carbon dioxide gas, resulting in different pore size distributions. Therefore, the bacterial cellulose-polyurethane composite material produced by the present invention has a gradient double-layer structure with different pore sizes, wherein one layer is a macroporous layer (mainly containing dominant complex B); and the other layer is a microporous layer (mainly containing dominant complex A). The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

In the production method as described above, preferably, it further comprises a process of purifying and homogenizing bacterial celluloses obtained by fermentation of strains to obtain the bacterial cellulose microfibrils; wherein the strains comprise one or more of *Acetobacter xylinum*, *Rhizobium*, *Sporosarcina*, *Pseudomonas*, *Achromobacter*, *Alcaligenes*, *Aerobacter*, and *Azotobacter*.

In the present invention, the method of fermentation of the above strains is a conventional method in this field. The fermentation medium is a conventional medium for the production of bacterial celluloses in this field, the fermentation time is generally 3-7 days, and the fermentation temperature is 30-37° C.

In the production method as described above, preferably, it further comprises a process of purifying and homogenizing bacterial celluloses obtained by fermentation of strains to obtain the bacterial cellulose microfibrils; wherein the process of purifying the bacterial celluloses comprises:

washing the bacterial celluloses in a 4 wt % to 8 wt % aqueous NaOH solution at a temperature of 70-100° C. for 4-6 h and then repeatedly rinsing with distilled water until neutral to remove bacterial proteins on the bacterial celluloses and residual medium adhering to the cellulose membrane, to obtain purified bacterial celluloses.

In the production method as described above, preferably, the process of homogenizing the bacterial celluloses is:

homogenizing the purified bacterial celluloses with a high-speed disperser at a rotating speed of 5,000-25,000 rpm for 5-10 min, to obtain the bacterial cellulose microfibrils.

In the production method as described above, preferably, the bacterial cellulose microfibrils have a length of 0.1-10 μm and a diameter of 50-100 nm. The bacterial cellulose microfibrils are fiber bundles formed by plying a plurality of nano-scale bacterial cellulose fibers through intermolecular hydrogen bonding.

In the production method as described above, preferably, the process of the organic solvent exchange treatment is:

immersing the bacterial cellulose microfibrils in anhydrous ethanol, to obtain the fully dehydrated bacterial cellulose microfibrils by controlling the immersing time to 8-12 h, and to obtain the partially dehydrated bacterial cellulose microfibrils by controlling the immersing time to 3-6 h;

immersing the fully dehydrated bacterial cellulose microfibrils in the organic solvent for 48-72 h, to obtain the complex A; and immersing the partially dehydrated bacterial cellulose microfibrils in the organic solvent for 12-48 h, to obtain the complex B.

In the present invention, the surface free water and the internal bound water of the bacterial cellulose microfibrils are controlled by immersing the bacterial cellulose microfibrils in anhydrous ethanol. As the immersing time of anhydrous ethanol increases, anhydrous ethanol will firstly precipitate free water on the surface of the bacterial cellulose microfibrils, and then precipitate the bound water inside the bacterial cellulose microfibrils (between the nanofibers that make up the microfibrils). The finally obtained complex A is a mixture of completely dehydrated bacterial cellulose microfibrils and an organic solvent, and complex B is a mixture of bacterial cellulose microfibrils having surface free water removed and still containing a small amount of bound water, and an organic solvent.

In the production method as described above, preferably, the organic solvent comprises one or more of ethyl glycol acetate, ethyl acetate, butyrolactone, acetic acid and acetone.

The organic solvent used in the present invention can reduce the interaction between the nano-scale cellulose fibers in the bacterial celluloses and water molecules, and avoid the existence of free water. This improves the reaction efficiency during the production of polyurethane foam, while strengthening the interfacial interaction between the bacterial nanocellulose fibers and the polyurethane.

In the production method as described above, preferably, the polyaddition reaction is performed in an oil bath at a constant temperature of 70-80° C. for 60-90 min.

In the production method as described above, preferably, the polymeric polyol comprises one or more of polyethylene glycol, polypropylene oxide, propylene glycol and diethylene glycol.

In the production method as described above, preferably, the process of curing the bacterial cellulose-polyurethane foam composite prepolymer is:

adding a curing aid to the bacterial cellulose-polyurethane foam composite prepolymer and stirring well, and then adding the diisocyanate compound and water and stirring well to obtain a mixture, followed by curing, to obtain the bacterial cellulose-polyurethane composite material.

In the production method as described above, preferably, the curing aid is used in an amount of 0.5-2.6 wt % based on the amount of the bacterial cellulose-polyurethane foam composite prepolymer.

In the production method as described above, preferably, the diisocyanate compound and water are used in a ratio of (20-40):(2-5).

In the production method as described above, preferably, during the curing, the diisocyanate compound is used in an amount of 20%-50% based on the amount of the polymeric polyol.

In the production method as described above, preferably, the diisocyanate compound comprises one or more of toluene diisocyanate, diphenylmethane diisocyanate and isophorone diisocyanate.

In the present invention, polymeric polyol and diisocyanate are used as soft segment structure and hard segment structure of the polyurethane material respectively, and the produced polyether type polyurethane has excellent mechanical properties and good biocompatibility.

In the production method as described above, preferably, the curing aid comprises a catalyst, a porogenic agent and a stabilizer;

the catalyst comprises one or more of triethylenediamine, dimethylethanolamine, dibutyltin dilaurate and stannous octoate;

the porogenic agent comprises one or more of porogenic silicone oil, silicone oil 6070 and polybutadiene glycol;

the stabilizer comprises one or more of silicone surfactant, sodium cocoamphoacetate, sodium lauroamphoacetate and disodium lauroamphodiacetate.

In the production method as described above, preferably, the catalyst is used in an amount of 0.3-1.5 wt % based on the amount of the bacterial cellulose-polyurethane foam composite prepolymer; the porogenic agent is used in an amount of 0.1-1 wt % based on the amount of the bacterial cellulose-polyurethane foam composite prepolymer; and the stabilizer is used in an amount of 0.1-0.5 wt % based on the amount of the bacterial cellulose-polyurethane foam composite prepolymer.

The use of the above-mentioned curing aid in the present invention is beneficial to the transformation of the polyurethane foam material from a liquid state to a solid state, while the residual isocyanate groups in the polyurethane reaction interact with the hydroxyl groups on the surface of the bacterial cellulose nanofibers to generate urethane bonds, which effectively combine the bacterial cellulose nanofibers with the polyurethane foam material by chemical bonding.

In the production method as described above, preferably, the curing is performed by placing the uniformly mixed and stirred mixture in a mold, and leaving to stand for 2-7 days at room temperature.

In another aspect, the present invention provides a bacterial cellulose-polyurethane composite material, which comprises at least a double-layer structure of a macroporous layer and a microporous layer, wherein the macroporous layer has a pore size of 100-500 µm, a porosity of 70%-90%, and a thickness of 0.5-1 cm; and the microporous layer has a pore size of 10-80 µm, a porosity of 60%-80%, and a thickness of 0.1-0.3 cm.

The bacterial cellulose-polyurethane composite material of the present invention is produced by the method as described above.

In the bacterial cellulose-polyurethane composite material as described above, the bacterial cellulose microfibrils are 20-40 wt % of the composite material, and a chemical bonding exists between the hydroxyl groups on the surface of the nanofibers and the residual isocyanate groups in the polyurethane.

The bacterial cellulose-polyurethane composite material produced by the present invention has a gradient double-layer structure with different pore sizes, wherein one layer is a macroporous layer, and the other layer is a microporous layer. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

In a further aspect, the present invention provides use of the above bacterial cellulose-polyurethane composite material in human body repair materials, smart drug sustained-release materials and tissue engineering materials.

Beneficial Effects of the Present Invention (1) In the present invention, with a composite of the bacterial celluloses microfibrils and the polyurethane foam material, the mechanical properties of the composite material are significantly improved. A large number of hydroxyl groups on the surface of bacterial cellulose nanofibers effectively enhance the hydrophilicity and water absorbability of the composite material. Meanwhile, the biocompatibility of the polyurethane material can be improved by good tissue affinity of the bacterial celluloses.

(2) In the present invention, the residual isocyanate groups in the polyurethane reaction interact with the hydroxyl groups on the surface of the bacterial cellulose nanofibers to effectively combine the bacterial cellulose nanofibers with the polyurethane foam matrix by chemical bonding.

(3) The production process of the present invention is simple, low-cost and pollution-free, and an environmentally friendly and degradable bacterial cellulose-polyurethane foam composite material can be obtained. The material has good biocompatibility, mechanical properties, hydrophilic/water-holding properties, and water absorbability, and has a great application prospect in biomedical fields, such as human body repair materials, smart drug sustained-release materials, and tissue engineering materials.

DETAILED DESCRIPTION OF PREFERRED EMBODIMENTS

In order to have a clearer understanding of the technical features, objects and beneficial effects of the present invention, the technical solutions of the present invention will now be described in detail below, but should not be construed as limiting the scope of implementation of the present invention.

The experimental methods used in the following examples are conventional methods, unless otherwise specified.

The materials, reagents, etc. used in the following examples can be obtained from commercial sources, unless otherwise specified.

Example 1

This example provided a method for producing a bacterial cellulose-polyurethane composite material, comprising the following steps.

In step 1, bacterial celluloses obtained by fermentation and culture of *Acetobacter xylinum* were immersed in a 4 wt % aqueous NaOH solution, heated at a temperature of 100° C. for 6 h, and then repeatedly rinsed with distilled water until neutral. Then, the purified bacterial cellulose sample was homogenized with a high-speed disperser at a rotating speed of 25,000 rpm for 10 min, to obtain bacterial cellulose microfibrils with a length of 0.1 μm and a diameter of 50 nm.

In step 2, The homogenized bacterial cellulose microfibrils were immersed in anhydrous ethanol for 8 h to ensure complete dehydration of the bacterial cellulose microfibrils. Then, the dehydrated bacterial cellulose microfibrils were immersed in an organic solvent, ethyl glycol acetate, for 48 h, to prepare a complex A. The complex A included 30 wt % of bacterial cellulose microfibrils and a balance of the organic solvent (including residual anhydrous ethanol and ethyl glycol acetate) based on 100 wt % of the complex A.

The homogenized bacterial cellulose microfibrils were immersed in anhydrous ethanol for 3 h to remove a majority of the water in the bacterial cellulose microfibrils. Then the partially dehydrated bacterial cellulose microfibrils were immersed in an organic solvent, acetic acid and acetone, for 12 h, to prepare a complex B. The complex B included 15 wt % of partially dehydrated bacterial cellulose microfibrils and a balance of organic solvent (including residual anhydrous ethanol, acetic acid and acetone) based on 100 wt % of the complex B; wherein the partially dehydrated bacterial cellulose microfibrils contained 5 wt % of water.

In step 3, the complex A and the complex B were mixed in a volume ratio of 1:2. Under the condition of an oil bath at a constant temperature of 70° C., a polymeric polyol and a small amount of a diisocyanate compound were added for polyaddition reaction. The reaction was carried out under stirring for 60 min to obtain a bacterial cellulose-polyurethane foam composite prepolymer. The amount of the polymeric polyol added was 20% of the total mass of the complex A and the complex B after mixing.

In step 4, a curing aid (catalyst+porogenic agent+stabilizer) was added to the bacterial cellulose-polyurethane foam composite prepolymer and stirred well. Then, the diisocyanate compound and water were added, stirred at a high speed, placed in a mold, and left to cure at room temperature for 2 days, to obtain the bacterial cellulose-polyurethane composite material.

Amounts: the added polymeric polyol was 100 parts by weight of polyethylene glycol; the added diisocyanate compound was 60 parts by weight of toluene diisocyanate, wherein a small amount of the diisocyanate compound, which accounted for 20% of the total weight of this substance, was added first; and 5 parts by weight of water was added.

The added curing aid comprised a catalyst, a porogenic agent and a stabilizer, wherein the catalyst was triethylenediamine in an amount of 0.3 wt % based on the amount of the bacterial cellulose-polyurethane foam composite prepolymer; the porogenic agent was porogenic silicone oil in an amount of 1 wt % based on the amount of the bacterial cellulose-polyurethane foam composite prepolymer; and the stabilizer was silicone surfactant in an amount of 0.5 wt % based on the amount of the bacterial cellulose-polyurethane foam composite prepolymer.

The bacterial cellulose-polyurethane composite material has a gradient double-layer structure with different pore sizes, wherein one layer is a macroporous layer with a pore size of 100 μm, a porosity of 70%, and a thickness of 0.5 cm; and the other layer is a microporous layer with a pore size of 10 a porosity of 60%, and a thickness of 0.1 cm. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

Example 2

This example provided a method for producing a bacterial cellulose-polyurethane composite material, comprising the following steps.

In step 1, bacterial celluloses obtained by fermentation and culture of *Rhizobium* and *Sporosarcina* were immersed in a 5 wt % aqueous NaOH solution, heated at a temperature of 90° C. for 5 h, and then repeatedly rinsed with distilled water until neutral. Then, the purified bacterial cellulose sample was homogenized with a high-speed disperser at a rotating speed of 20,000 rpm for 5 min, to obtain bacterial cellulose microfibrils with a length of 2 μm and a diameter of 60 nm.

In step 2, the homogenized bacterial cellulose microfibrils were immersed in anhydrous ethanol for 10 h to ensure complete dehydration of the bacterial cellulose microfibrils. Then, the dehydrated bacterial cellulose microfibrils were immersed in an organic solvent, ethyl acetate, for 36 h, to prepare a complex A. The complex A included 40 wt % of bacterial cellulose microfibrils and a balance of organic solvent (including residual anhydrous ethanol and ethyl acetate) based on 100 wt % of the complex A.

The homogenized bacterial cellulose microfibrils were immersed in anhydrous ethanol for 4 h to remove a majority of the water in the bacterial cellulose microfibrils. Then the partially dehydrated bacterial cellulose microfibrils were immersed in an organic solvent, acetone, for 48 h, to prepare a complex B. The complex B included 20 wt % of partially dehydrated bacterial cellulose microfibrils and a balance of organic solvent (including residual anhydrous ethanol and acetone) based on 100 wt % of the complex B; wherein the partially dehydrated bacterial cellulose microfibrils contained 5 wt % of water.

In step 3, the complex A and the complex B were mixed in a volume ratio of 1:3. Under the condition of an oil bath at a constant temperature of 70° C., a polymeric polyol and a small amount of a diisocyanate compound were added for polyaddition reaction. The reaction was carried out under stirring for 70 min to obtain a bacterial cellulose-polyurethane foam composite prepolymer. The amount of the polymeric polyol added was 30% of the total mass of the complex A and the complex B after mixing.

In step 4, a curing aid (catalyst+porogenic agent+stabilizer) was added to the bacterial cellulose-polyurethane foam composite prepolymer and stirred well. Then, the diisocyanate compound and water were added, stirred at a high speed, placed in a mold, and left to cure at room temperature for 3 days, to obtain the bacterial cellulose-polyurethane composite material.

Amounts: the added polymeric polyol was 100 parts by weight of polypropylene oxide; the added diisocyanate compound was 60 parts by weight of diphenylmethane diisocyanate, wherein a small amount of the diisocyanate compound, which accounted for 20% of the total weight of this substance, was added first; and 5 parts by weight of water was added.

The added curing aid comprised a catalyst, a porogenic agent and a stabilizer, wherein the catalyst was dimethylethanolamine in an amount of 0.7 wt % based on the amount of the bacterial cellulose-polyurethane foam composite prepolymer; the porogenic agent was silicone oil 6070 in an amount of 0.8 wt % based on the amount of the bacterial cellulose-polyurethane foam composite prepolymer; and the stabilizer was sodium cocoamphoacetate in an amount of 0.4 wt % based on the amount of the bacterial cellulose-polyurethane foam composite prepolymer.

The bacterial cellulose-polyurethane composite material has a gradient double-layer structure with different pore sizes, wherein one layer is a macroporous layer with a pore size of 200 μm, a porosity of 70%, and a thickness of 0.7 cm; and the other layer is a microporous layer with a pore size of 20 μm, a porosity of 60%, and a thickness of 0.1 cm. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

Example 3

This example provided a method for producing a bacterial cellulose-polyurethane composite material, comprising the following steps.

In step 1, bacterial celluloses obtained by fermentation and culture of *Pseudomonas* and *Achromobacter* were immersed in a 6 wt % aqueous NaOH solution, heated at a temperature of 80° C. for 4 h, and then repeatedly rinsed with distilled water until neutral. Then, the purified bacterial cellulose sample was homogenized with a high-speed disperser at a rotating speed of 25,000 rpm for 6 min, to obtain bacterial cellulose microfibrils with a length of 4 μm and a diameter of 70 nm.

In step 2, the homogenized bacterial cellulose microfibrils were immersed in anhydrous ethanol for 9 h to ensure complete dehydration of the bacterial cellulose microfibrils. Then, the dehydrated bacterial cellulose microfibrils were immersed in an organic solvent, butyrolactone, for 72 h, to prepare a complex A. The complex A included 50 wt % of bacterial cellulose microfibrils and a balance of organic solvent (including residual anhydrous ethanol and butyrolactone) based on 100 wt % of the complex A.

The homogenized bacterial cellulose microfibrils were immersed in anhydrous ethanol for 5 h to remove a majority of the water in the bacterial cellulose microfibrils. Then the partially dehydrated bacterial cellulose microfibrils were immersed in an organic solvent, ethyl glycol acetate, for 12 h, to prepare a complex B. The complex B included 30 wt % of partially dehydrated bacterial cellulose microfibrils and a balance of organic solvent (including residual anhydrous ethanol and ethyl glycol acetate) based on 100 wt % of the complex B; wherein the partially dehydrated bacterial cellulose microfibrils contained 10 wt % of water.

In step 3, the complex A and the complex B were mixed in a volume ratio of 1:4. Under the condition of an oil bath at a constant temperature of 70° C., a polymeric polyol and a small amount of a diisocyanate compound were added for polyaddition reaction. The reaction was carried out under stirring for 60 min to obtain a bacterial cellulose-polyurethane foam composite prepolymer. The amount of the polymeric polyol added was 40% of the total mass of the complex A and the complex B after mixing.

In step 4, a curing aid (catalyst+porogenic agent+stabilizer) was added to the bacterial cellulose-polyurethane foam composite prepolymer and stirred well. Then, the diisocyanate compound and water were added, stirred at a high speed, placed in a mold, and left to cure at room temperature for 4 days, to obtain the bacterial cellulose-polyurethane composite material.

Amounts: the added polymeric polyol was 100 parts by weight in total of propylene glycol and diethylene glycol (1:1); the added diisocyanate compound was 50 parts by weight of isophorone diisocyanate, wherein a small amount of the diisocyanate compound, which accounted for 20% of the total weight of this substance, was added first; and 3 parts by weight of water was added.

The added curing aid comprised a catalyst, a porogenic agent and a stabilizer, wherein the catalyst was dibutyltin dilaurate in an amount of 0.9 wt % based on the amount of the bacterial cellulose-polyurethane foam composite prepolymer; the porogenic agent was polybutadiene glycol in an amount of 0.5 wt % based on the amount of the bacterial cellulose-polyurethane foam composite prepolymer; and the stabilizer was sodium lauroamphoacetate used in an amount of 0.3 wt % based on the amount of the bacterial cellulose-polyurethane foam composite prepolymer.

The bacterial cellulose-polyurethane composite material has a gradient double-layer structure with different pore sizes, wherein one layer is a macroporous layer with a pore size of 300 μm, a porosity of 80%, and a thickness of 0.8 cm; and the other layer is a microporous layer with a pore size of 40 μm, a porosity of 70%, and a thickness of 0.2 cm. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

Example 4

This example provided a method for producing a bacterial cellulose-polyurethane composite material, comprising the following steps.

In step 1, bacterial celluloses obtained by fermentation and culture of *Alcaligenes, Aerobacter* and *Azotobacter* were immersed in a 7 wt % aqueous NaOH solution, heated at a temperature of 70° C. for 4 h, and then repeatedly rinsed with distilled water until neutral. Then, the purified bacterial cellulose sample was homogenized with a high-speed disperser at a rotating speed of 15,000 rpm for 8 min, to obtain bacterial cellulose microfibrils with a length of 6 μm and a diameter of 80 nm.

In step 2, the homogenized bacterial cellulose microfibrils were immersed in anhydrous ethanol for 10 h to ensure complete dehydration of the bacterial cellulose microfibrils. Then, the dehydrated bacterial cellulose microfibrils were immersed in an organic solvent, acetic acid and acetone, for 36 h, to prepare a complex A. The complex A included 30 wt % of bacterial cellulose microfibrils and a balance of organic solvent (including residual anhydrous ethanol, acetic acid and acetone) based on 100 wt % of the complex A.

The homogenized bacterial cellulose microfibrils were immersed in anhydrous ethanol for 6 h to remove a majority of the water in the bacterial cellulose microfibrils. Then the partially dehydrated bacterial cellulose microfibrils were immersed in an organic solvent, acetone, for 12 h, to prepare a complex B. The complex B included 23 wt % of partially dehydrated bacterial cellulose microfibrils and a balance of organic solvent (including residual anhydrous ethanol and acetone) based on 100 wt % of the complex B; wherein the partially dehydrated bacterial cellulose microfibrils contained 8 wt % of water.

In step 3, the complex A and the complex B were mixed in a volume ratio of 1:5. Under the condition of an oil bath at a constant temperature of 80° C., a polymeric polyol and a small amount of a diisocyanate compound were added for polyaddition reaction. The reaction was carried out under stirring for 70 min to obtain a bacterial cellulose-polyurethane foam composite prepolymer. The amount of the polymeric polyol added was 50% of the total mass of the complex A and the complex B after mixing.

In step 4, a curing aid (catalyst+porogenic agent+stabilizer) was added to the bacterial cellulose-polyurethane foam composite prepolymer and stirred well. Then, the diisocyanate compound and water were added, stirred at a high speed, placed in a mold, and left to cure at room temperature for 5 days, to obtain the bacterial cellulose-polyurethane composite material.

Amounts: the added polymeric polyol was 100 parts by weight in total of polyethylene glycol and polypropylene oxide (1:1); the added diisocyanate compound was 50 parts by weight in total of toluene diisocyanate and diphenylmethane diisocyanate (1:1), wherein a small amount of the diisocyanate compound, which accounted for 10% of the total weight of this substance, was added first; and 2 parts by weight of water was added.

The added curing aid comprised a catalyst, a porogenic agent and a stabilizer, wherein the catalyst was triethylenediamine and stannous octoate (1:1) in an amount of 1.0 wt % based on the amount of the bacterial cellulose-polyurethane foam composite prepolymer; the porogenic agent was porogenic silicone oil and silicone oil 6070 (1:1) in an amount of 0.5 wt % based on the amount of the bacterial cellulose-polyurethane foam composite prepolymer; and the stabilizer was disodium lauroamphodiacetate in an amount of 0.2 wt % based on the amount of the bacterial cellulose-polyurethane foam composite prepolymer.

The bacterial cellulose-polyurethane composite material has a gradient double-layer structure with different pore sizes, wherein one layer is a macroporous layer with a pore size of 300 μm, a porosity of 80%, and a thickness of 0.6 cm; and the other layer is a microporous layer with a pore size of 50 μm, a porosity of 70%, and a thickness of 0.2 cm. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

Example 5

This example provided a method for producing a bacterial cellulose-polyurethane composite material, comprising the following steps.

In step 1, bacterial celluloses obtained by fermentation and culture of *Acetobacter xylinum* and *Pseudomonas* were immersed in a 6 wt % aqueous NaOH solution, heated at a temperature of 100° C. for 5 h, and then repeatedly rinsed with distilled water until neutral. Then, the purified bacterial cellulose sample was homogenized with a high-speed disperser at a rotating speed of 10,000 rpm for 9 min, to obtain bacterial cellulose microfibrils with a length of 8 μm and a diameter of 90 nm.

In step 2, the homogenized bacterial cellulose microfibrils were immersed in anhydrous ethanol for 11 h to ensure complete dehydration of the bacterial cellulose microfibrils. Then, the dehydrated bacterial cellulose microfibrils were immersed in an organic solvent, ethyl glycol acetate and ethyl acetate, for 48 h, to prepare a complex A. The complex A included 40 wt % of bacterial cellulose microfibrils and a balance of organic solvent (including residual anhydrous ethanol, ethyl glycol acetate and ethyl acetate) based on 100 wt % of the complex A.

The homogenized bacterial cellulose microfibrils were immersed in anhydrous ethanol for 7 h to remove a majority of the water in the bacterial cellulose microfibrils. Then the partially dehydrated bacterial cellulose microfibrils were immersed in an organic solvent, ethyl glycol acetate, for 36 h, to prepare a complex B. The complex B included 26 wt % of partially dehydrated bacterial cellulose microfibrils and a balance of organic solvent (including residual anhydrous ethanol and ethyl glycol acetate) based on 100 wt % of the complex B; wherein the partially dehydrated bacterial cellulose microfibrils contained 6 wt % of water.

In step 3, the complex A and the complex B were mixed in a volume ratio of 1:3. Under the condition of an oil bath at a constant temperature of 80° C., a polymeric polyol and a small amount of a diisocyanate compound were added for polyaddition reaction. The reaction was carried out under stirring for 80 min to obtain a bacterial cellulose-polyurethane foam composite prepolymer. The amount of the polymeric polyol added was 60% of the total mass of the complex A and the complex B after mixing.

In step 4, a curing aid (catalyst+porogenic agent+stabilizer) was added to the bacterial cellulose-polyurethane foam composite prepolymer and stirred well. Then, the diisocyanate compound and water were added, stirred at a high speed, placed in a mold, and left to cure at room temperature for 6 days, to obtain the bacterial cellulose-polyurethane composite material.

Amounts: the added polymeric polyol was 100 parts by weight in total of polyethylene glycol and propylene glycol (2:1); the added diisocyanate compound was 40 parts by weight in total of diphenylmethane diisocyanate and isophorone diisocyanate (1:1), wherein a small amount of the diisocyanate compound, which accounted for 10% of the total weight of this substance, was added first; and 3 parts by weight of water was added.

The added curing aid comprised a catalyst, a porogenic agent and a stabilizer, wherein the catalyst was dimethylethanolamine and stannous octoate (1:1) in an amount of 1.2 wt % based on the amount of the bacterial cellulose-polyurethane foam composite prepolymer; the porogenic agent was porogenic silicone oil and polybutadiene glycol (2:1) in an amount of 0.3 wt % based on the amount of the bacterial cellulose-polyurethane foam composite prepolymer; and the stabilizer was silicone surfactant and sodium cocoamphoacetate (1:1) in an amount of 0.1 wt % based on the amount of the bacterial cellulose-polyurethane foam composite prepolymer.

The bacterial cellulose-polyurethane composite material has a gradient double-layer structure with different pore sizes, wherein one layer is a macroporous layer with a pore size of 400 a porosity of 90%, and a thickness of 0.9 cm; and the other layer is a microporous layer with a pore size of 60 a porosity of 80%, and a thickness of 0.3 cm. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

Example 6

This example provided a method for producing a bacterial cellulose-polyurethane composite material, comprising the following steps.

In step 1, bacterial celluloses obtained by fermentation and culture of *Acetobacter xylinum* were immersed in an 8 wt % aqueous NaOH solution, heated at a temperature of 80° C. for 6 h, and then repeatedly rinsed with distilled water until neutral. Then, the purified bacterial cellulose sample was homogenized with a high-speed disperser at a rotating speed of 5,000 rpm for 10 min, to obtain bacterial cellulose microfibrils with a length of 10 μm and a diameter of 100 nm.

In step 2, the homogenized bacterial cellulose microfibrils were immersed in anhydrous ethanol for 12 h to ensure complete dehydration of the bacterial cellulose microfibrils. Then, the dehydrated bacterial cellulose microfibrils were immersed in an organic solvent, ethyl acetate and acetone, for 72 h, to prepare a complex A. The complex A included 50 wt % of bacterial cellulose microfibrils and balance of organic solvent (residual anhydrous ethanol and ethyl acetate were included in the balance of organic solvent) based on 100 wt % of the complex A.

The homogenized bacterial cellulose microfibrils were immersed in anhydrous ethanol for 6 h to remove a majority of the water in the bacterial cellulose microfibrils. Then the partially dehydrated bacterial cellulose microfibrils were immersed in an organic solvent, ethyl acetate, for 48 h, to prepare a complex B. The complex B included 30 wt % of partially dehydrated bacterial cellulose microfibrils and balance of organic solvent (the balance of organic solvent included residual anhydrous ethanol and ethyl acetate) based on 100 wt % of the complex B; wherein the partially dehydrated bacterial cellulose microfibrils contained 10 wt % of water.

In step 3, the complex A and the complex B were mixed in a volume ratio of 1:2. Under the condition of an oil bath at a constant temperature of 80° C., a polymeric polyol and a small amount of a diisocyanate compound were added for polyaddition reaction. The reaction was carried out under stirring for 90 min to obtain a bacterial cellulose-polyurethane foam composite prepolymer. The amount of the polymeric polyol added was 40% of the total mass of the complex A and the complex B after mixing.

In step 4, a curing aid (catalyst+porogenic agent+stabilizer) was added to the bacterial cellulose-polyurethane foam composite prepolymer and stirred well. Then, the diisocyanate compound and water were added, stirred at a high speed, placed in a mold, and left to cure at room temperature for 7 days, to obtain the bacterial cellulose-polyurethane composite material.

Amounts: the added polymeric polyol was 100 parts by weight of polyethylene glycol; the added diisocyanate compound was 40 parts by weight in total of toluene diisocyanate and isophorone diisocyanate (4:1), wherein a small amount of the diisocyanate compound, which accounted for 10% of the total weight of this substance, was added first; and 4 parts by weight of water was added.

The added curing aid comprised a catalyst, a porogenic agent and a stabilizer, wherein the catalyst was dibutyltin dilaurate and stannous octoate (1:1) in an amount of 1.5 wt % based on the amount of the bacterial cellulose-polyurethane foam composite prepolymer; the porogenic agent was porogenic silicone oil, silicone oil 6070 and polybutadiene glycol (2:1:1) in an amount of 0.1 wt % based on the amount of the bacterial cellulose-polyurethane foam composite prepolymer; and the stabilizer was sodium cocoamphoacetate, sodium lauroamphoacetate and disodium lauroamphodiacetate (1:1:1) in an amount of 0.1 wt % based on the amount of the bacterial cellulose-polyurethane foam composite prepolymer.

The bacterial cellulose-polyurethane composite material has a gradient double-layer structure with different pore sizes, wherein one layer is a macroporous layer with a pore size of 500 a porosity of 90%, and a thickness of 1 cm; and the other layer is a microporous layer with a pore size of 80 a porosity of 80%, and a thickness of 0.3 cm. The bacterial cellulose-polyurethane composite material is an organic entirety composed of the macroporous layer and the microporous layer. During use, the microporous layer, which serves as an upper layer, can prevent water and bacteria, and control the moisture vapor transmission rate; the macroporous layer, which serves as a lower layer, can maintain the moist microenvironment of the wound, control the wound exudate, and promote wound healing.

Performance Test Experiments:

The following performance tests were performed on the bacterial cellulose-polyurethane composite materials prepared in the Examples.

Moisture vapor transmission rate test of permeable film dressing: the bacterial cellulose-polyurethane composite material was tested for moisture vapor transmission rate in accordance with YY/T 0471.2-2004 "Test Methods for Primary Wound Dressings—Part 2: Water Vapour Transmission Rate of Permeable Film Dressings", wherein the moisture vapor transmission rate (MVTR) was 1600 $g \cdot m^{-2} \cdot 24\ h^{-1}$.

Biocompatibility test: the bacterial cellulose-polyurethane composite material was evaluated for cytotoxicity, delayed contact sensitization in guinea pigs, skin irritation, etc in accordance with GB/T 16886 Biological evaluation of medical devices.

Biocompatibility evaluation: cytotoxicity test was performed in accordance with GB/T 16886-5 "Biological evaluation of medical devices—Part 5: Tests for in vitro cytotoxicity"; delayed contact sensitization test in guinea pigs was performed in accordance with GB/T 16886-10 "Biological evaluation of medical devices—Part 10: Tests for irritation and delayed-type hypersensitivity", using the maximization test Magnusson and Kligman method; skin irritation test was performed in accordance with GB/T 16886-10 "Biological evaluation of medical devices—Part 10: Tests for irritation and delayed-type hypersensitivity".

The results show that bacterial cellulose-polyurethane composite materials prepared in the Examples of the present invention have a cytotoxicity of less than grade 2, no skin sensitization response and no intradermal irritation response, and have good biological safety.

The invention claimed is:

1. A method for producing a bacterial cellulose-polyurethane composite material, comprising:
    subjecting bacterial cellulose microfibrils to an organic solvent exchange treatment to obtain a complex A and a complex B having different concentrations of bacterial cellulose microfibrils;
    wherein the complex A includes 30-50 wt % of fully dehydrated bacterial cellulose microfibrils and a balance of organic solvent based on 100 wt % of the complex A; the complex B includes 15-30 wt % of partially dehydrated bacterial cellulose microfibrils and a balance of organic solvent based on 100 wt % of the complex B; and wherein the partially dehydrated bacterial cellulose microfibrils contain 5-10 wt % of water;
    mixing the complex A and the complex B in a volume ratio of 1:2-5, and adding a polymeric polyol and a diisocyanate compound under the condition of an oil bath for polyaddition reaction, to obtain a bacterial cellulose-polyurethane foam composite prepolymer; and
    curing the prepolymer to obtain the bacterial cellulose-polyurethane composite material;
    wherein the weight ratio of the polymeric polyol to the diisocyanate compound is 1:0.1-0.2; and the polymeric polyol accounts for 20%-60% of the total weight of the complex A and the complex B.

2. The method according to claim 1, further comprising a process of purifying and homogenizing bacterial celluloses obtained by fermentation of strains to obtain the bacterial cellulose microfibrils; wherein the strains comprise one or more of *Acetobacter xylinum, Rhizobium, Sporosarcina, Pseudomonas, Achromobacter, Alcaligenes, Aerobacter*, and *Azotobacter*.

3. The method according to claim 1, further comprising a process of purifying and homogenizing bacterial celluloses obtained by fermentation of strains to obtain the bacterial cellulose microfibrils; wherein the process of purifying the bacterial celluloses comprises:
    washing the bacterial celluloses in a 4 wt % to 8 wt % aqueous NaOH solution at a temperature of 70-100° C. for 4-6 h and then repeatedly rinsing with distilled water until neutral to remove bacterial proteins on the bacterial celluloses and residual medium adhering to the cellulose membrane, to obtain purified bacterial celluloses.

4. The method according to claim 3, wherein the process of homogenizing the bacterial celluloses is:
    homogenizing the purified bacterial celluloses with a high-speed disperser at a rotating speed of 5,000-25,000 rpm for 5-10 min, to obtain the bacterial cellulose microfibrils.

5. The method according to claim 1, wherein the bacterial cellulose microfibrils have a length of 0.1-10 μm and a diameter of 50-100 nm.

6. The method according to claim 1, wherein the organic solvent exchange treatment is:
    immersing the bacterial cellulose microfibrils in anhydrous ethanol, to obtain the fully dehydrated bacterial cellulose microfibrils by controlling the immersing time to 8-12 h, and to obtain the partially dehydrated bacterial cellulose microfibrils by controlling the immersing time to 3-6 h;
    immersing the fully dehydrated bacterial cellulose microfibrils in the organic solvent for 48-72 h, to obtain the complex A; and
    immersing the partially dehydrated bacterial cellulose microfibrils in the organic solvent for 12-48 h, to obtain the complex B.

7. The method according to claim 1, wherein the organic solvent comprises one or more of ethyl glycol acetate, ethyl acetate, butyrolactone, acetic acid, and acetone.

8. The method according to claim 1, wherein the polyaddition reaction is performed in an oil bath at a constant temperature of 70-80° C. for 60-90 min.

9. The method according to claim 1, wherein, the polymeric polyol comprises one or more of polyethylene glycol, polypropylene oxide, propylene glycol and diethylene glycol.

10. The method according to claim 1, wherein the process of curing the bacterial cellulose-polyurethane foam composite prepolymer is:
    adding a curing aid to the bacterial cellulose-polyurethane foam composite prepolymer and stirring well, and then adding the diisocyanate compound and water and stirring well to obtain a mixture, followed by curing, to obtain the bacterial cellulose-polyurethane composite material;
    the curing aid is used in an amount of 0.5-2.6 wt % based on the amount of the bacterial cellulose-polyurethane foam composite prepolymer;
    the diisocyanate compound and water are used in a ratio of 20-40:2-5;
    during the curing, the diisocyanate compound is used in an amount of 20%-50% based on the amount of the polymeric polyol.

11. The method according to claim 10, wherein the diisocyanate compound comprises one or more of toluene diisocyanate, diphenylmethane diisocyanate and isophorone diisocyanate.

12. The method according to claim 10, wherein the curing aid comprises a catalyst, a porogenic agent and a stabilizer.

13. The method according to claim 12, wherein the catalyst comprises one or more of triethylenediamine, dimethylethanolamine, dibutyltin dilaurate and stannous octoate.

14. The method according to claim 12, wherein the porogenic agent comprises one or more of porogenic silicone oil, silicone oil 6070 and polybutadiene glycol.

15. The method according to claim 12, wherein the stabilizer comprises one or more of silicone surfactant, sodium cocoamphoacetate, sodium lauroamphoacetate and disodium lauroamphodiacetate.

16. The method according to claim 12, wherein the catalyst is used in an amount of 0.3-1.5 wt % based on the amount of the bacterial cellulose-polyurethane foam composite prepolymer; the porogenic agent is used in an amount of 0.1-1 wt % based on the amount of the bacterial cellulose-polyurethane foam composite prepolymer; and the stabilizer is used in an amount of 0.1-0.5 wt % based on the amount of the bacterial cellulose-polyurethane foam composite prepolymer.

* * * * *